(12) United States Patent
Guichard et al.

(10) Patent No.: US 6,602,154 B1
(45) Date of Patent: Aug. 5, 2003

(54) HYDRAULIC TENSIONER FOR AN ENDLESS CHAIN OR LINKAGE FOR USE IN AN INTERNAL COMBUSTION ENGINE

(75) Inventors: Daniel Guichard, Gillonnay (FR); Nicolas Charles, Saint Martin d'Heres (FR)

(73) Assignee: Sachs Automotive France, S.A., Saint Simeon de Bressieux (FR)

( * ) Notice: Subject to any disclaimer, the term of this patent is extended or adjusted under 35 U.S.C. 154(b) by 0 days.

(21) Appl. No.: 09/466,610

(22) Filed: Dec. 17, 1999

(30) Foreign Application Priority Data

Dec. 22, 1998 (FR) .............................. 98 16210

(51) Int. Cl.$^7$ .............................. F16H 7/12; F16H 7/22
(52) U.S. Cl. .................................. 474/110; 474/101
(58) Field of Search .......................... 474/110, 109, 474/111, 135, 136, 138, 101

(56) References Cited

U.S. PATENT DOCUMENTS

| | | | |
|---|---|---|---|
| 4,850,941 A | | 7/1989 | Sosson |
| 5,601,505 A | * | 2/1997 | Tada ............................ 474/110 |
| 5,653,653 A | * | 8/1997 | Ledvina ................... 474/111 X |
| 6,086,497 A | * | 7/2000 | Fukuda et al. ............... 474/110 |
| 6,120,402 A | * | 9/2000 | Preston et al. ........... 474/110 X |
| 6,165,090 A | * | 12/2000 | Simpson ...................... 474/110 |
| 6,244,981 B1 | * | 6/2001 | Simpson ...................... 474/110 |
| 6,244,982 B1 | * | 6/2001 | Merelli ........................ 474/138 |

FOREIGN PATENT DOCUMENTS

FR        2 610 685 A1        2/1987

* cited by examiner

Primary Examiner—Thomas R. Hannon
Assistant Examiner—Colby Hansen
(74) Attorney, Agent, or Firm—Baker & Daniels

(57) ABSTRACT

A hydraulic chain tensioner for an internal combustion engine includes a support body forming a cylindrical housing which receives a piston slidable in the housing and which carries a pressure pad acted upon by the piston and arranged to come into contact with the chain. A high-pressure chamber is defined by the housing and the piston. A source of pressurized hydraulic liquid supplies the tensioner with lubricating liquid and completes the filling of the high-pressure chamber. The high-pressure chamber is connected to the ambient surroundings by gas-purging orifice

5 Claims, 3 Drawing Sheets

HYDRAULIC TENSIONER FOR AN ENDLESS CHAIN OR LINKAGE FOR USE IN AN INTERNAL COMBUSTION ENGINE

FIELD OF THE INVENTION

The present invention relates to hydraulic chain tensioners for internal combustion engines.

The invention is particularly concerned with a hydraulic chain tensioner comprising: a support body forming a cylindrical housing receiving a piston slidable in the housing and carrying a pressure pad acted upon by the piston and arranged to come into contact with the chain, a high-pressure chamber defined by the housing and by the piston and arranged for communication with a pressurized hydraulic liquid thereby to supply the tensioner with lubricating liquid and to complete the filling of the high-pressure chamber.

DESCRIPTION OF THE PRIOR ART

Hydraulic tensioners of this type are already known for chains or other transmission elements referred to as endless linkages such as those described for example in FR-A-2 610 685. These tensioners are connected to a source of pressurized hydraulic liquid such as the oil pump of the heat engine. The tensioner exerts pressure via its piston onto the chain. When the chain becomes slack, the piston exits its housing so that the pressure of the liquid in the housing falls and when this pressure is less than the pressure of the hydraulic liquid, the valve opens and hydraulic liquid enters the so-called high-pressure chamber of the tensioner. The tensioner opposes the vibrating movements of the chain since its chamber contains a liquid which is incompressible in principle.

However, sometimes the hydraulic liquid, i.e. the oil of the lubrication circuit, contains dissolved gasses or gasses in the form of an emulsion. These gasses can separate progressively from the liquid and form a cushion of air in the high-pressure chamber of the tensioner. The behaviour of the tensioner is then changed in relationship to the volume of compressed gas. Moreover, and in particular after a prolonged stoppage of the engine, it may be the case that the tensioner does not immediately carry out its function after the engine has been started up, for as long as the pressure of the hydraulic liquid supplied by the liquid source fails to reach the appropriate level.

SUMMARY OF THE INVENTION

The present invention proposes to develop an improved hydraulic tensioner for an endless chain or linkage of the type first referred to above.

To this end the invention relates to a hydraulic tensioner of the type initially defined above having the high-pressure chamber connected to the ambient surroundings via a gas-purging orifice.

According to one advantageous preferred feature, a compression spring acts between the support body and the pad pressing on the endless chain or linkage. This spring makes it possible to absorb vibrations of the chain when the engine is first started up, when the high-pressure chamber has not yet been charged with pressurized liquid.

This spring may be helicoidal compression spring surrounding the piston and bearing against an edge of the housing receiving the piston.

The spring can alternatively be a helicoidal compression spring housed in the high-pressure chamber between the base of said chamber and the adjacent end of the piston.

In both cases it is advantageous to provide the device with a locking member permitting the pad to be held in a retracted piston for mounting operations and arranged to be released only when the tensioner has been installed.

BRIEF DESCRIPTION OF THE DRAWINGS

The present invention will be described in more detail hereinafter with reference to the accompanying drawings. In the drawings.

DESCRIPTION OF THE PREFERRED EMBODIMENTS

Figure 2:
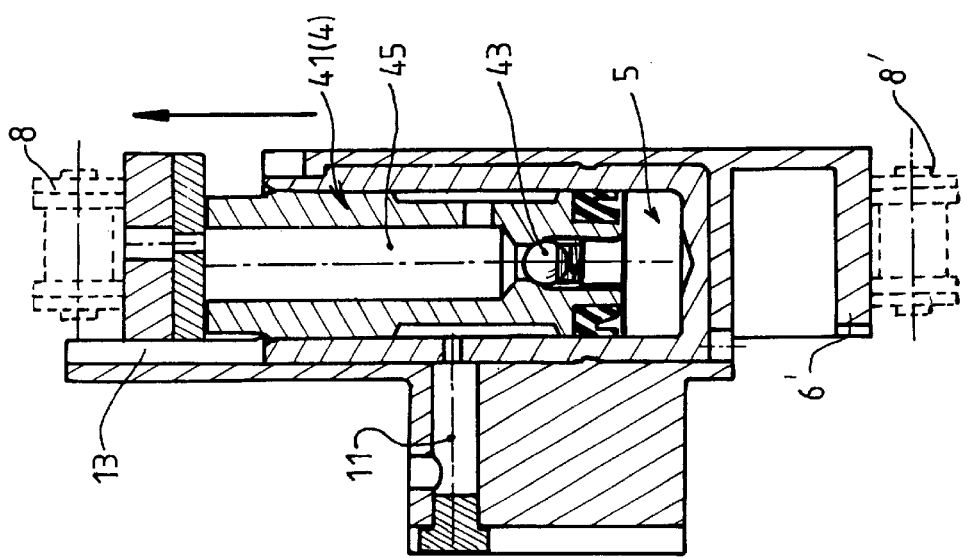
FIG. 2 is a cross-sectional view of the tensioner of FIG. 1, in the deployed position.
Figure 1:
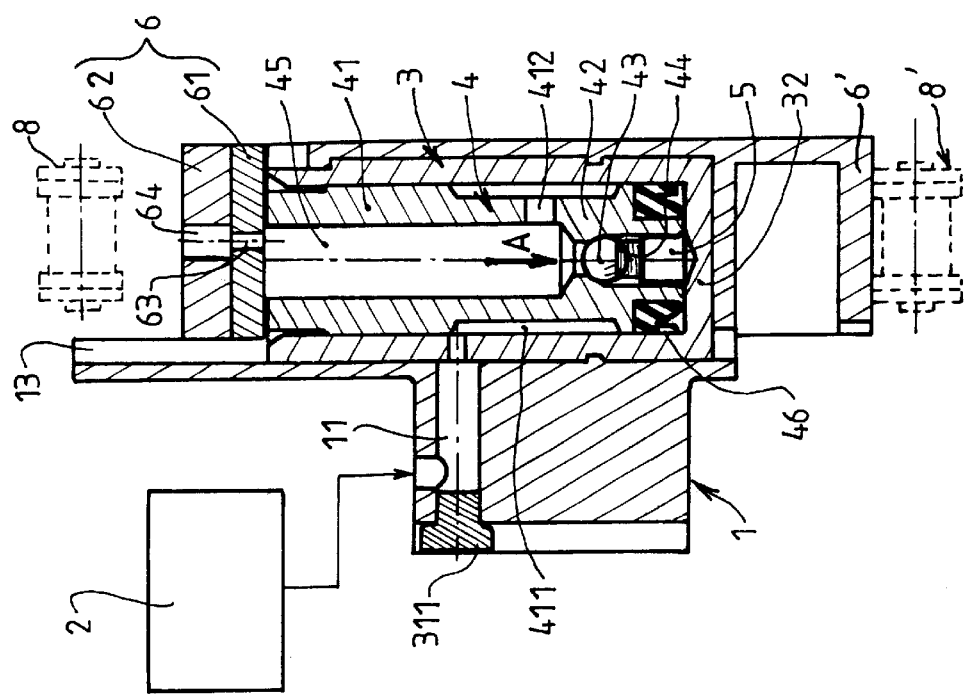
FIG. 1 is a cross-sectional view of a hydraulic tensioner according to the prior art, in the retracted position.

According to FIGS. 1 and 2, a known hydraulic tensioner for an endless chain or linkage comprises a support 1 serving to mount the tensioner. This support 1 comprises a duct 11 for the passage of hydraulic liquid, connected to a source 2 of hydraulic liquid such as a pump supplying lubrication oil.

The support 1 receives a casing 3 forming the housing for a piston 4 comprising a cylindrical sleeve 41 sliding in the casing 3 and a base 42 defining a high-pressure chamber 5 with the base 32 of the casing 3. The base 42 is provided with a ball valve 43 with a calibrated spring 44 defining the opening pressure of the ball valve 43. The direction of passage is indicated by the arrow A. The cylindrical sleeve 41 of the piston 4 is provided, over a certain length, with a cut-away or free part 411 into which opens a through orifice 412 communicating with the cavity 45 of the piston. This cavity 45 is connected to the high-pressure chamber 5 via the valve 43.

The casing 3 comprises, in its peripheral surface, a port 311 connecting the duct 11 with the cut-away zone 411 of the piston 4 to permit entry of hydraulic liquid no matter what the displacement position of the piston 4 with respect to the casing 3. The base 42 of the piston comprises a gasket 46 providing a seal.

Thus, in this known tensioner, the high-pressure chamber is closed in a sealed manner by the casing 3 and the base 42 of the piston.

The piston 4 bears on the strand 8 of the chain by way of a pad 6 pushed by the piston 4. The pad 6 is formed by a support strip 61 carrying a slide element 62. The pad 6 has a double orifice 63, 64 extending through it, which issues into the cavity 45 in order to permit passage of the oil serving to lubricate the strand 8 of the chain. The support 1 comprises a guide surface 13 serving to guide the movement of the pad 6.

In the known example illustrated in FIGS. 1 and 2, the tensioner also serves as a support for the other strand 8' of the chain by way of an extension 6' of the main body of the support.

FIG. 2 shows the known tensioner in the operational position. The high-pressure chamber 5 is filled with liquid at a certain pressure and the pad 6 is pushed against the strand 8 of the chain at the pressure transmitted by the piston. As the hydraulic fluid in the high-pressure chamber 5 is incompressible the chain cannot vibrate.

It should be noted that the other strand 8' is not tensioned by the tensioner since the tensioner is mounted in a fixed manner and it exerts its pressure on the strand 8, the strand 8' simply being supported against the corresponding lower part 6' of the support 1.

A first embodiment of a tensioner according to the invention will now be described with the aid of FIGS. 3 and 4.

Figure 3:
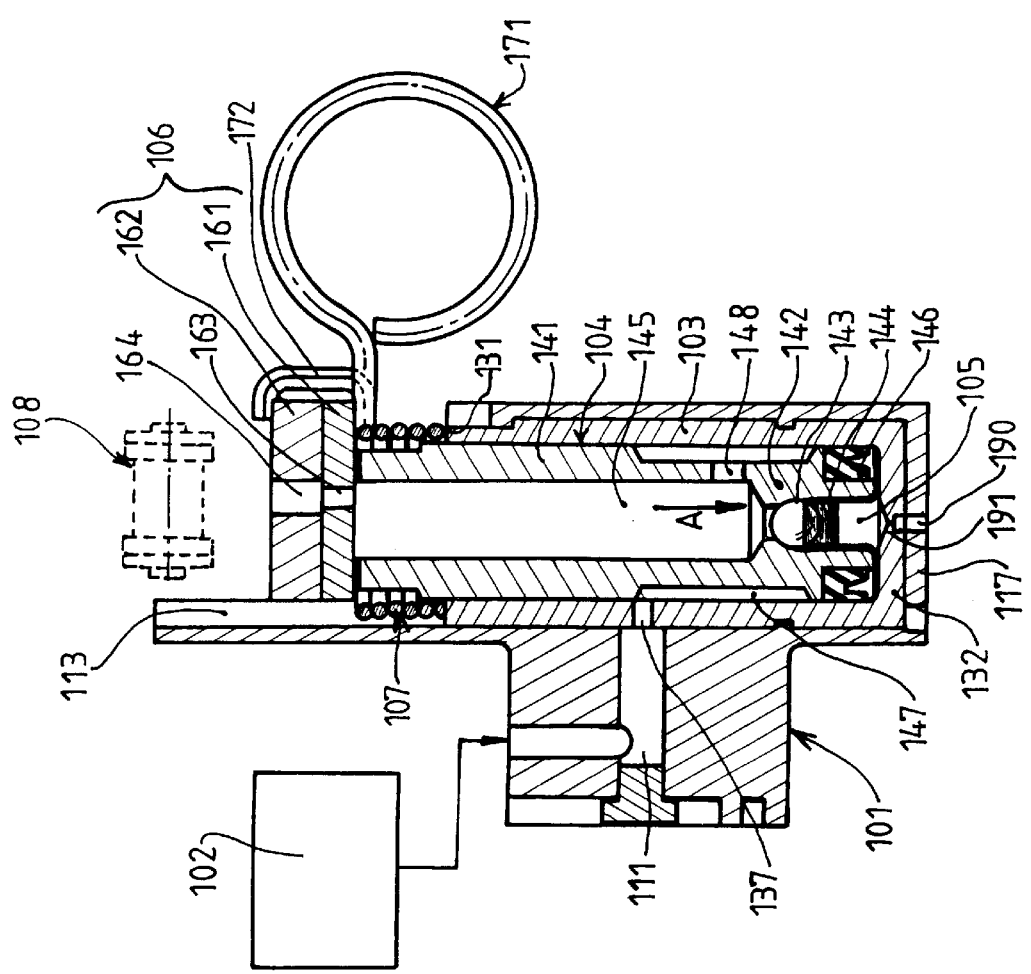
FIG. 3 is a cross-sectional view of a hydraulic tensioner according to the invention, in the retracted position.

According to FIG. 3, the invention relates to a hydraulic tensioner for an endless chain and linkage, represented by the strand 108 which lies apart from the tensioner when the tensioner is in the retracted position. The tensioner comprises a support 101 intended to mount it. This support comprises a duct 111 through which it receives hydraulic liquid from a source 102 of hydraulic liquid, for example, the lubrication oil pump. The support 101 comprises a casing 103 housing a piston 104 formed from a cylindrical sleeve 141 and from a base 142. The base is provided with a ball valve 143 loaded by a calibrated spring 144 to permit passage of pressurized liquid in the direction indicated by the arrow A.

The periphery of the cylindrical sleeve 141 is provided, over a part of its length, with a cut-away zone 147 into which issues a through orifice 148 communicating with a cavity 145 of the piston. The valve 143 permits communication between the cavity 145 and a high-pressure chamber 105.

The cut-away zone 147 extends over a length of the piston substantially corresponding to its length of travel. This zone 147 communicates with the duct 111 by a port 137 to permit entry of pressurized liquid from the source 102 through the duct 111, the port 137, the cut-away peripheral zone 147 and the orifice 148 as far as the cavity 145 in order to supply the high-pressure chamber 105 via the valve 143. The base of the piston also includes a sealing gasket 146 and the top of the piston or at least the sleeve 141 bears against a pad 106 formed from a support strip 161 and a slide element 162. These two elements are each traversed by an orifice 163, 164. These orifices provide communication between the cavity 145 and the outer surface of the slide element 162 and permit passage of the lubrication liquid to lubricate the strand 108 when the pad 106 is pushed against the strand 108 (operational position illustrated in FIG. 4).

The pad 106 is guided in its translational movement by a guide surface 113 of the support 101.

A compression spring 107 is mounted between the support 101 and the pad 106. In the embodiment of FIG. 3 this helicoidal compression spring 107 bears against the upper edge 131 of the casing 103 and the lower surface of the strip 161 of the pad. A locking member 171 has a hook 172 to hold the pad 106 in the retracted position illustrated in FIG. 3. This locking member 171 is carried by a fixed element of the installation.

The locking member 171 opposes the resilient force exerted by the compression spring 107.

Figure 4:
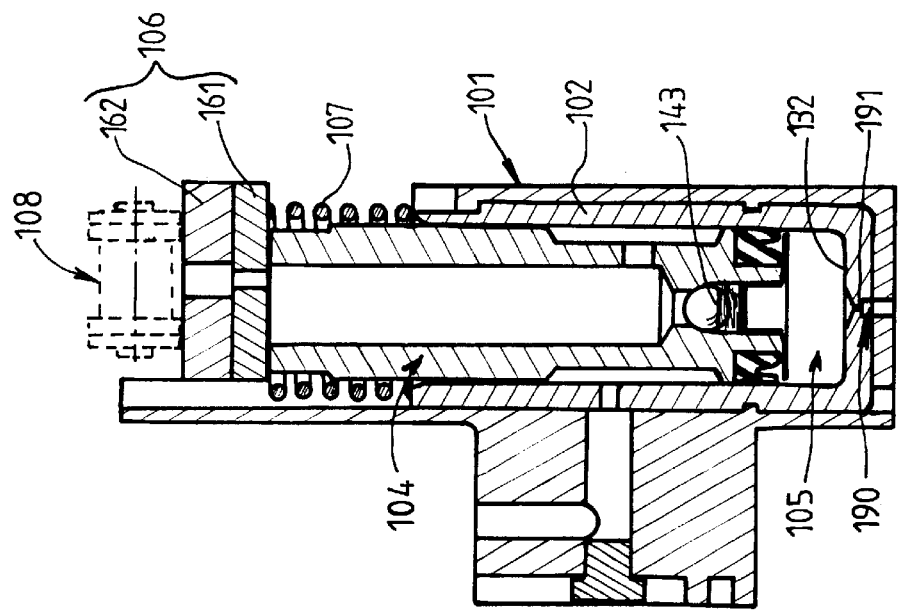
FIG. 4 is a view of the tensioner of FIG. 3, in the deployed position.

FIG. 4 shows the hydraulic tensioner according to the invention in the operational position. In this position the pad 106 is pushed against the strand 108 of the endless chain or linkage. This bearing relationship is initially produced by the spring 107 after the pad is released, i.e. after removal of the lock 171 (this lock is not shown in FIG. 4).

The base 132 of the casing 103 and the base 117 of the support 101 are traversed by an orifice 190, which has a fixed cross-section, in the base 117 and which is calibrated in the casing 103 by a throttling zone 191. This calibrated orifice 190, 191 is of a size sufficient to permit air trapped in the high-pressure chamber 105 to escape but the orifice is sufficiently small to retain the hydraulic liquid. This orifice 190, 191 permits purging of the high-pressure chamber 105 so that it contains only liquid and not a mixture of liquid and gas or a cushion of gas or air with the liquid.

As gas is released, if this is the case, from the highly pressurized hydraulic liquid contained in the chamber 105, this gas escapes via the orifice 190 and its throttle zone 191. This reduction in the volume of the high-pressure chamber 105 is compensated by the arrival of a new quantity of liquid through the valve 143.

Even before the pressurized liquid arrives in the high-pressure chamber 105 of the tensioner, the spring 107 pushes the slide element 162 of the pad 106 against the strand 108. The piston 104 does not necessarily occupy the position illustrated in FIG. 4 at this moment. It is only when the pressure of the hydraulic liquid supplied by the source 102 charges the high-pressure chamber 105 and pushes the piston 104 that it occupies the position illustrated in FIG. 4.

Figure 6:
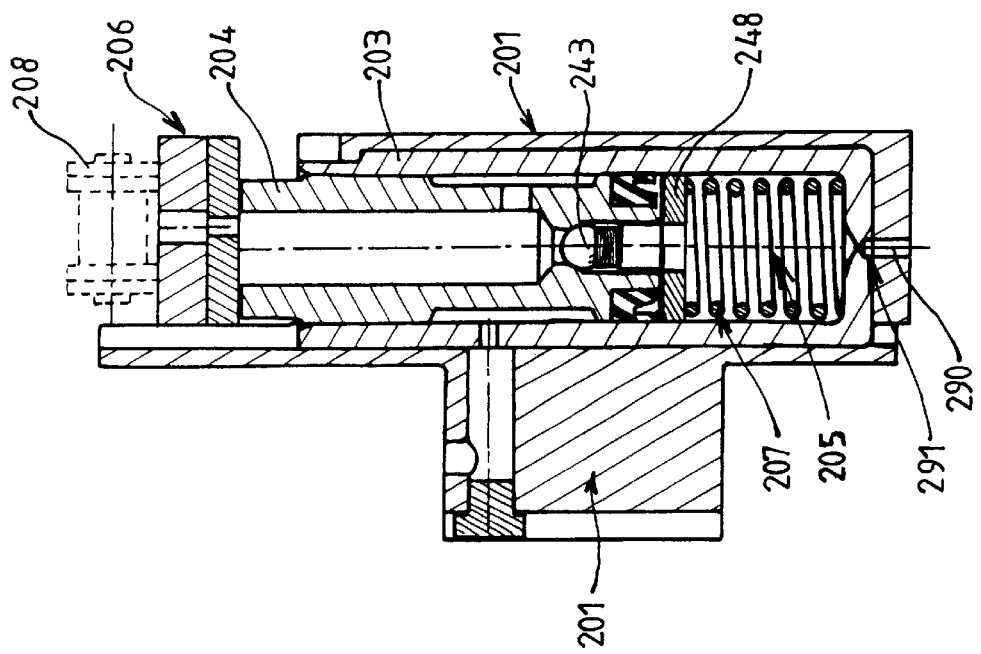
FIG. 6 is a cross-sectional view of the tensioner of FIG. 5, in the deployed position.
Figure 5:
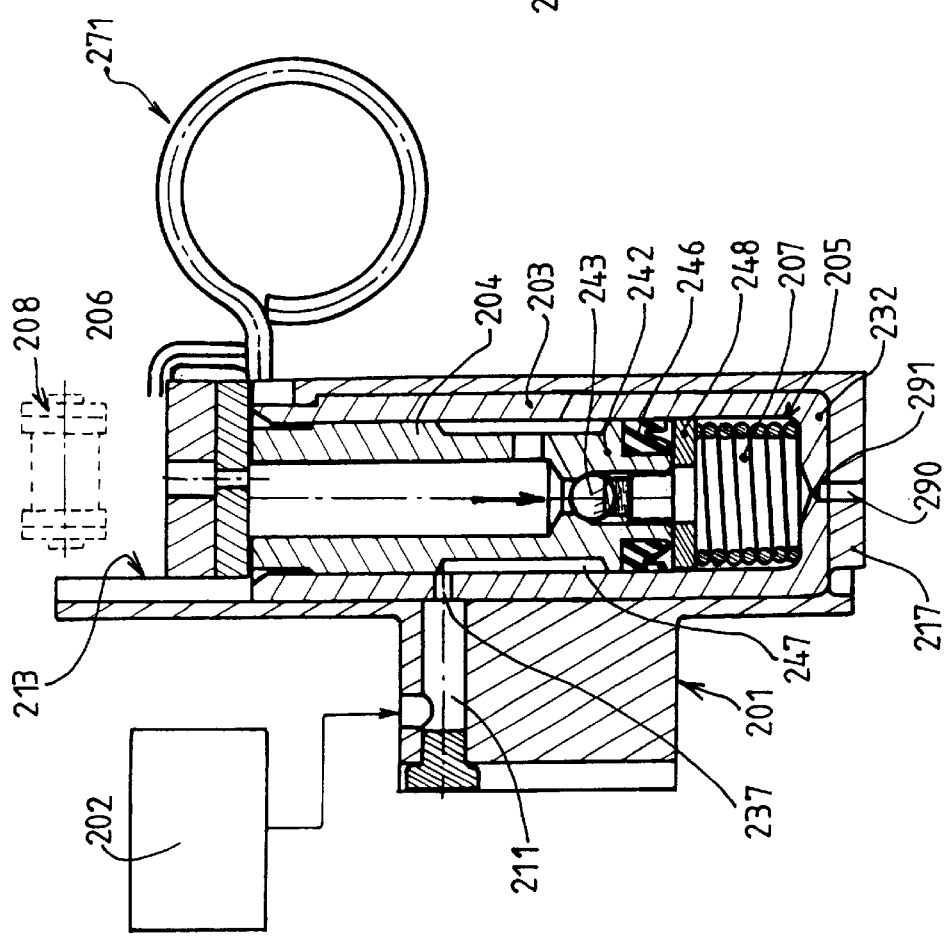
FIG. 5 is a cross-sectional view of a different embodiment of a tensioner according to the invention, in the retracted position.

FIGS. 5 and 6 show another embodiment of hydraulic tensioner according to the invention. This embodiment is similar to the first embodiment and the references used to designate the different elements are the same as those used above merely increased by 100.

The description will be limited to the differences.

According to this second embodiment, the compression spring acting between the support 201 and the strand 208 of the chain is not mounted around the piston 204 but between the base 232 of the casing 203 and the base 242 of the piston 204. In order to form an abutment surface for the spring 207 a washer 248 is provided which bears against the base 242 of the piston 204 and protects the gasket 246.

The pad 206 is again held by a locking member 271 which acts against the action of the spring 207.

The operation of this second embodiment of the hydraulic tensioner and in particular the evacuation of air contained in the high-pressure chamber 205, which is of dimensions necessarily larger than those of the first embodiment since it houses the compression spring 207, is similar to that described above. The feature of this second embodiment is that of housing the spring 207 in a protected manner. In this second embodiment, the pad 206 is still pressed, if only gently, against the strand 208 by the spring by way of the piston 204, whereas in the first embodiment the spring does not act by way of the piston but directly by the spring acting between the support and the pad.

What is claimed is:

1. A hydraulic chain tensioner for tensioning a chain of an internal combustion engine, said tensioner comprising:
   support body defining a housing;
   a piston slidably disposed in said housing;
   a pressure pad operatively associated with said piston for contacting a chain;
   said housing and piston defining a high-pressure chamber, said chamber adapted to fluidly communicate with a source of pressurized hydraulic fluid;
   a gas-purging orifice disposed in said support body, said orifice directly fluidly communicating said chamber with the ambient exterior of said support body, whereby air in said chamber may be directly purged from said chamber to the ambient.

2. The tensioner of claim 1 and further comprising a compression spring disposed between said support body and said pad.

3. The tensioner of claim 2 wherein said spring surrounds said piston.

4. The tensioner of claim 2 and further comprising a locking member for selectively retaining said spring in a compressed position and for locking said pad in a retracted position against the biasing force of said spring.

5. The tensioner of claim 1 and further comprising a helical compression spring disposed between said piston and said housing.

* * * * *